United States Patent
Sakurai et al.

(10) Patent No.: US 11,162,283 B2
(45) Date of Patent: Nov. 2, 2021

(54) VEHICLE LID LOCK DEVICE

(71) Applicant: Johnan Manufacturing Inc., Nagano (JP)

(72) Inventors: Yuta Sakurai, Nagano (JP); Koji Sasaki, Nagano (JP)

(73) Assignee: Johnan Manufacturing Inc., Nagano (JP)

( * ) Notice: Subject to any disclaimer, the term of this patent is extended or adjusted under 35 U.S.C. 154(b) by 621 days.

(21) Appl. No.: 16/043,213

(22) Filed: Jul. 24, 2018

(65) Prior Publication Data

US 2019/0024415 A1    Jan. 24, 2019

(30) Foreign Application Priority Data

Jul. 24, 2017    (JP) .............................. JP2017-142729

(51) Int. Cl.
*E05B 77/34*    (2014.01)
*E05B 83/34*    (2014.01)
(Continued)

(52) U.S. Cl.
CPC .............. *E05B 77/34* (2013.01); *B60K 15/05* (2013.01); *E05B 81/06* (2013.01); *E05B 81/18* (2013.01);
(Continued)

(58) Field of Classification Search
CPC .......... E05B 81/06; E05B 81/18; E05B 81/16; E05B 81/36; E05B 83/34; E05B 85/02;
(Continued)

(56) References Cited

U.S. PATENT DOCUMENTS 5,222,774 A * 6/1993 Fukumoto ............... E05B 81/14
                                                                  292/144
7,007,954 B2    3/2006 Travers
(Continued)

FOREIGN PATENT DOCUMENTS

CN    102917904 A    2/2013
CN    205591700 U  * 9/2016
(Continued)

OTHER PUBLICATIONS

Japanese Office Action dated Jul. 3, 2018 issued in JP 2017-142729, together with partial translation.
(Continued)

*Primary Examiner* — Kristina R Fulton
*Assistant Examiner* — James Edward Ignaczewski
(74) *Attorney, Agent, or Firm* — Scully, Scott, Murphy & Presser, PC (57) ABSTRACT

A vehicle lid lock device includes a locking member for locking a lid provided on a vehicle, a housing member in which an insertion hole is formed into which the locking member is inserted and which houses the locking member enabled to move backward and forward; and an annular seal member that is housed in a housing portion of the housing member and that seals a gap between an inner surface of the insertion hole of the housing member and an outer surface of the locking member. The seal member includes a main body including an inner peripheral surface with an inner diameter larger than an outer diameter of the locking member, and a lip portion that protrudes radially inward from the inner peripheral surface of the main body and that is in slide contact with the outer surface of the locking member.

2 Claims, 7 Drawing Sheets

(51) Int. Cl.
*E05B 85/02* (2014.01)
*B60K 15/05* (2006.01)
*E05B 81/18* (2014.01)
*E05B 81/06* (2014.01)
*F16H 21/44* (2006.01)
*E05B 81/36* (2014.01)
*F16H 19/00* (2006.01)
*E05B 81/16* (2014.01)

(52) U.S. Cl.
CPC .............. *E05B 83/34* (2013.01); *E05B 85/02* (2013.01); *B60K 2015/053* (2013.01); *B60K 2015/0538* (2013.01); *B60K 2015/0576* (2013.01); *B60K 2015/0584* (2013.01); *B60Y 2400/702* (2013.01); *E05B 81/16* (2013.01); *E05B 81/36* (2013.01); *F16H 19/001* (2013.01); *F16H 21/44* (2013.01)

(58) Field of Classification Search
CPC .............. B60K 15/05; B60K 2015/053; B60K 2015/0538; B60K 2015/0576; B60K 2015/0584; B60Y 2400/702; F16H 19/001; F16H 21/44; F16J 15/02; F16J 15/022; F16J 15/061
See application file for complete search history.

(56) References Cited

U.S. PATENT DOCUMENTS

| | | | |
|---|---|---|---|
| 8,622,442 B2 * | 1/2014 | Imatomi | E05B 83/34 292/143 |
| 9,944,172 B2 | 4/2018 | Basavarajappa et al. | |
| 2005/0001377 A1 | 1/2005 | Travers | |
| 2012/0248792 A1 * | 10/2012 | Ban | E05B 81/90 292/144 |
| 2013/0102163 A1 * | 4/2013 | Basavarajappa | E05B 81/66 439/34 |
| 2013/0154402 A1 * | 6/2013 | Basavarajappa | H02K 7/06 310/20 |
| 2013/0341938 A1 * | 12/2013 | Niwa | E05B 81/16 292/164 |
| 2015/0115619 A1 * | 4/2015 | Ito | E05B 79/20 292/137 |
| 2016/0230889 A1 * | 8/2016 | O'Brien | F16J 15/025 |
| 2016/0290017 A1 * | 10/2016 | Nakanishi | E05B 81/34 |

FOREIGN PATENT DOCUMENTS

| | | |
|---|---|---|
| CN | 205591700 U | 9/2016 |
| DE | 199 46 133 A1 | 3/2001 |
| EP | 1 748 232 A1 | 1/2007 |
| GB | 2520154 A | 5/2015 |
| JP | 2013-145034 A | 7/2013 |
| JP | 2014-118694 A | 6/2014 |
| JP | 2016-188542 A | 11/2016 |
| JP | 2017054671 A * | 3/2017 |
| WO | 2014098090 A1 | 6/2014 |

OTHER PUBLICATIONS

Chinese Office Action dated Dec. 18, 2019 in Chinese Patent Application No. 201810812213.2.
UK Combined Search and Examination Report dated Jan. 8, 2019 from related GB1811682.2.
Chinese Office Action dated Jun. 10, 2020 from related Chinese Patent Application No. 201810812213.2 together with English language translation.

* cited by examiner

VEHICLE LID LOCK DEVICE

BACKGROUND OF INVENTION

The present application is based on Japanese patent application No. 2017-142729 filed on Jul. 24, 2017, the entire contents of which are incorporated herein by reference.

FIELD OF INVENTION

The invention relates to a vehicle lid lock device.

DESCRIPTION OF RELATED ART

A vehicle lid lock device is known which locks and unlocks a flap on a vehicle (see, e.g., JP 2016/188542).

The vehicle lid lock device (the lid lock device) disclosed in JP 2016/188542 is provided with a housing fixed to a vehicle body and a locking member axially movably provided on the housing to lock a lid. The locking member has a main shaft portion and a middle portion extending from the main shaft portion. A recessed groove into which a sealing member is inserted therein is formed on the outer surface of the main shaft portion. A seal member (sealing member) is attached to seal a gap between an opening of the housing and the locking member.

SUMMARY OF INVENTION

The vehicle lid lock device disclosed in JP 2016/188542, however, may have a problem that a waterproof property thereof deteriorates due to the seal member deformed when the seal member is attached to the locking member.

It is an object of the invention to provide a vehicle lid lock device that prevents the deterioration of the waterproof property due to the deformation of the seal member.

According to an embodiment of the present invention, a vehicle lid lock device comprises:
   a locking member for locking a lid provided on a vehicle;
   a housing member in which an insertion hole is formed into which the locking member is inserted and which houses the locking member enabled to move backward and forward; and
   an annular seal member that is housed in a housing portion of the housing member and that seals a gap between an inner surface of the insertion hole of the housing member and an outer surface of the locking member,
wherein the seal member comprises a main body comprising an inner peripheral surface with an inner diameter larger than an outer diameter of the locking member, and a lip portion that protrudes radially inward from the inner peripheral surface of the main body and that is in slide contact with the outer surface of the locking member.

Effects of Invention

According to an embodiment of the present invention, a vehicle lid lock device can be provided that prevents the deterioration of the waterproof property due to the deformation of the seal member.

BRIEF DESCRIPTION OF DRAWINGS

Next, the present invention will be explained in more detail in conjunction with appended drawings, wherein:

FIGS. 3A and 3B are diagrams illustrating a configuration of the vehicle lid lock device, wherein

DETAILED DESCRIPTION OF EMBODIMENTS

Summary of the Embodiment

A vehicle lid lock device in the present embodiment is provided with a locking member for locking a lid provided on a vehicle, a housing member that comprises an insertion hole for inserting the locking member and houses the locking member to be movable backward and forward, and an annular seal member that is housed in a housing portion of the housing member and seals a gap between an inner surface of the insertion hole of the housing member and an outer surface of the locking member, wherein the seal member comprises a main body comprising an inner peripheral surface with an inner diameter larger than an outer diameter of the locking member, and a lip portion protruding radially inward from the inner peripheral surface of the main body and being in slide contact with the outer periphery of the locking member.

This vehicle lid lock device is configured that a gap is formed between the inner peripheral surface of the main body of the seal member and the outer surface of the locking member. Therefore, as compared to when not adopting such configuration, sliding resistance at the time of inserting the seal member onto the locking member is reduced and it is thereby possible to prevent a decrease in waterproof properties due to deformation of the seal member.

Embodiment

The configuration and operation of the vehicle lid lock device to lock a fuel lid covering and uncovering a fuel filler port will be described as an embodiment of the invention in reference to FIGS. 1 to 6. The vehicle lid lock device can switch between the locked state and unlocked state of a fuel lid 91 which covers and uncovers a fuel filler opening 9a of a vehicle body 9. Although the vehicle lid lock device described in the present embodiment is a device used to lock a fuel lid fuel lid covering and uncovering a fuel filler port, it is not limited thereto. The vehicle lid lock device of the invention may be used as, e.g., a device for opening and closing a lid provided at an electric charge port. A vehicle lid lock device 100 is schematically shown in FIGS. 1 and 2.

General Configuration of the Vehicle Lid Lock Device

Figure 1:
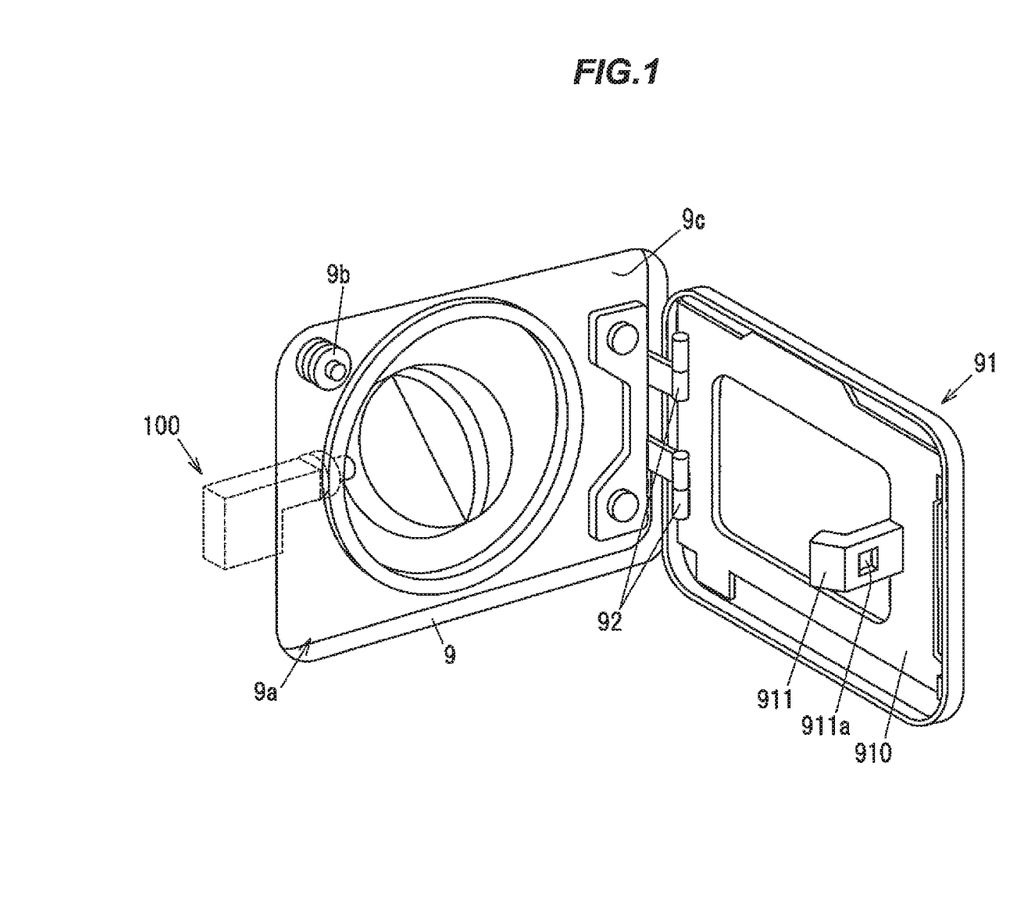
FIG. 1 is a perspective view showing a fuel filler opening and the periphery of a vehicle body on which a vehicle lid lock device in the present embodiment is installed.
Figure 2:
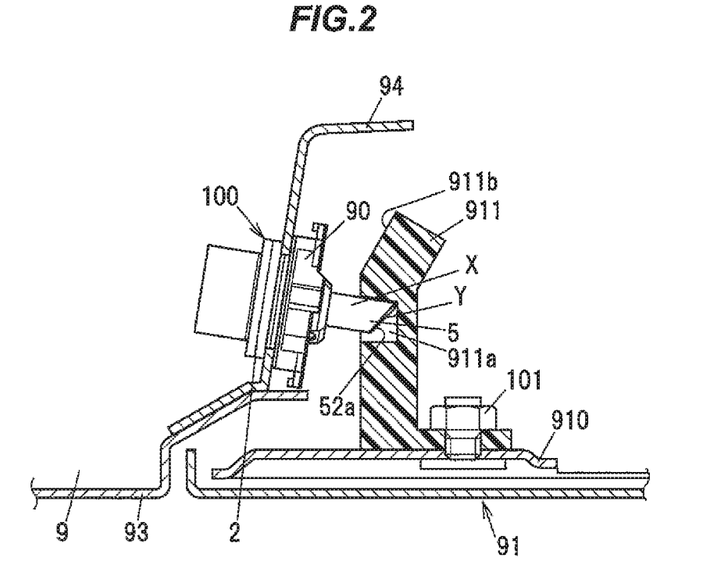
FIG. 2 is a cross sectional view showing a structure of a fuel lid and the periphery in a state of being locked by the vehicle lid lock device.

FIG. 1 is a perspective view showing the fuel filler opening 9a and the fuel lid 91 of the vehicle body on which the vehicle lid lock device 100 in the present embodiment is installed. FIG. 2 is a cross sectional view showing a structure of the fuel lid 91 and the periphery in a state of being locked by the vehicle lid lock device 100.

As shown in FIG. 1, the fuel lid 91 is openably/closably attached to the vehicle body 9 by hinges 92 and covers or uncovers the fuel filler opening 9a provided on the vehicle body 9. A locking plate 911 to be engaged with the vehicle lid lock device 100 is provided on an attachment bearing surface 910 which is located on the inner side of the fuel lid 91. A recessed portion 911a to be engaged with a tip portion of a moving member 5 (described later) of the vehicle lid lock device 100 is formed on the locking plate 911. An open spring 9b for applying a force in an opening direction of the fuel lid 91 is provided on a facing surface 9c of the vehicle body 9 which faces the attachment bearing surface 910 of the fuel lid 91.

As shown in FIG. 2, the locking plate 911 is a member formed of, e.g., a resin and is fixed to the attachment bearing surface 910 of the fuel lid 91 by a bolt 101. The vehicle lid lock device 100 is fixed, via a vehicle body attachment member 90, to an inner panel 94 of the vehicle body 9 provided inside with respect to an outer panel 93.

When the fuel lid 91 is closed, the tip portion of the moving member 5 of the vehicle lid lock device 100 is engaged with the recessed portion 911a of the locking plate 911 of the fuel lid 91 and the fuel lid 91 is thereby locked in the closed state. Then, when opening the fuel lid 91, the vehicle lid lock device 100 is activated by, e.g., a driver's operation on a lid opener actuator provided on a driver's seat, and the moving member 5 moves from a protruded position Y, at which the moving member 5 protrudes from a housing member 2, to a retracted position X (dash-dot-dot line), at which the moving member 5 is retracted into the housing member 2. Accordingly, the tip portion of the moving member 5 is withdrawn from the recessed portion 911a of the locking plate 911 of the fuel lid 91, and the fuel lid 91 receives a force from the open spring 9b and is half-opened. In this manner, the fuel lid 91 is unlocked and opened.

Configuration of the Vehicle Lid Lock Device

Figure 3A:
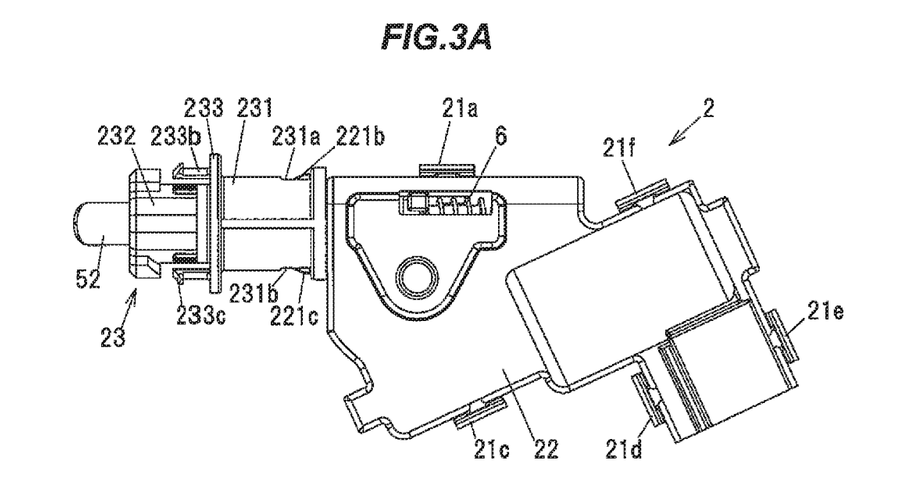
FIG. 3A is a plan view in a state that a case member and a cover member are assembled and FIG. 3B is a plan view in a state that the cover member is removed from the case member.
Figure 3B:
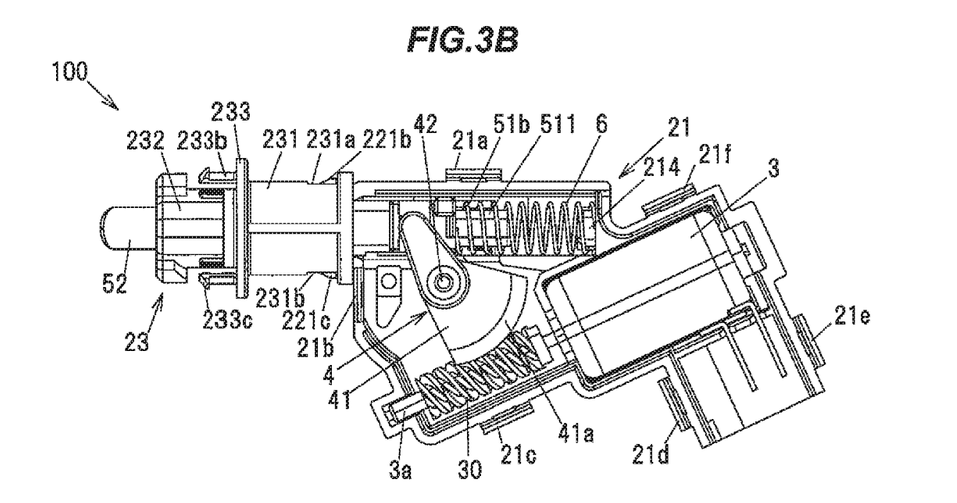
Figure 4:
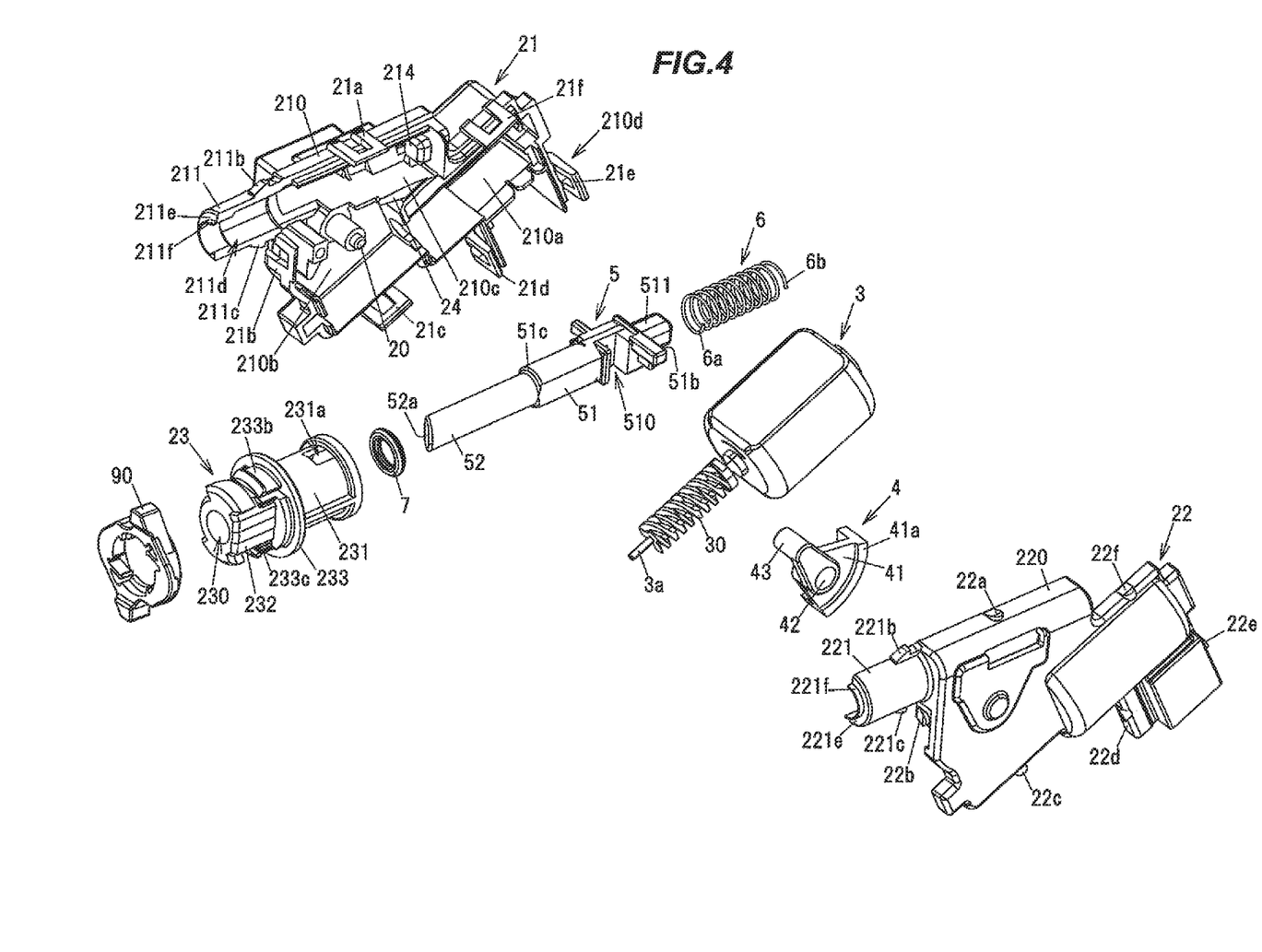
FIG. 4 is an exploded perspective view showing the vehicle lid lock device shown in FIG. 3.
Figure 5A:
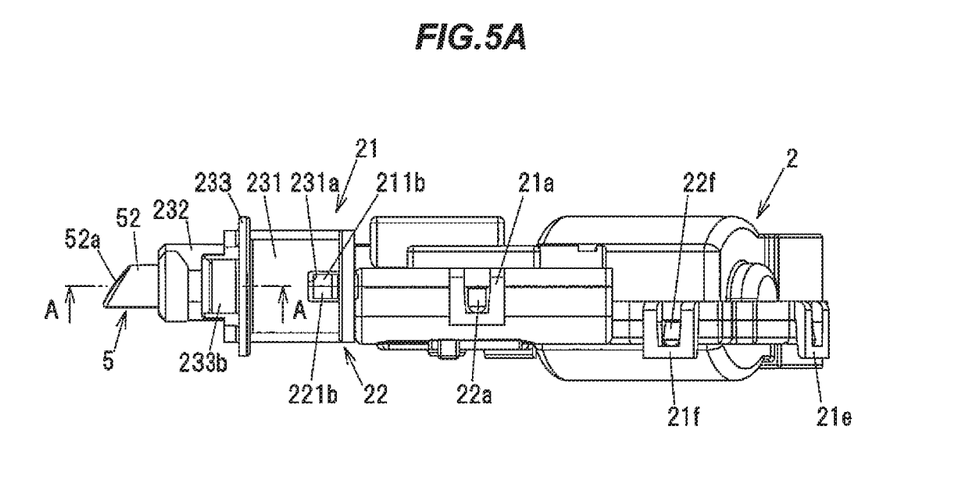
FIG. 5A is a top view showing the vehicle lid lock device.
Figure 5B:
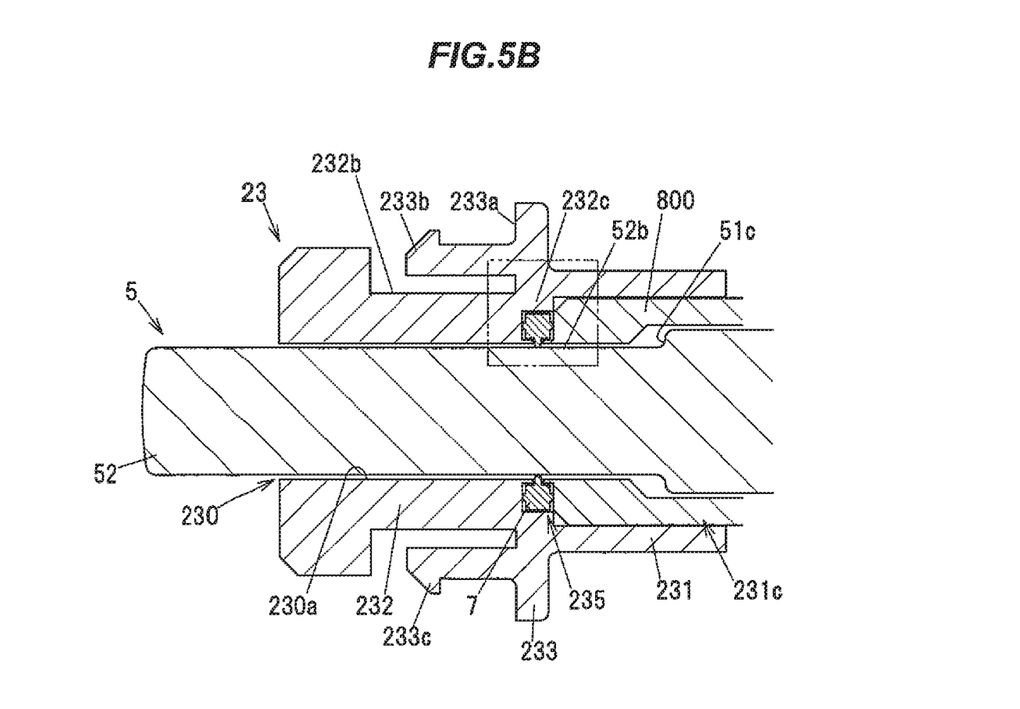
FIG. 5B is a cross sectional view taken along a line A-A in FIG. 5A.

FIG. 3 shows an example configuration of the vehicle lid lock device 100, wherein FIG. 3A is a plan view showing an assembled state in which a case member 21 is attached to a cover member 22, and FIG. 3B is a plan view showing a state in which the cover member 22 is removed from the case member 21. FIG. 4 is an exploded perspective view showing the vehicle lid lock device 100 in FIG. 3. FIG. 5A is a top view showing the vehicle lid lock device and FIG. 5B is a cross sectional view taken along the line A-A in FIG. 5A.

The vehicle lid lock device 100 has a motor 3 having an output shaft 3a coupled to a worm 30, a sector gear 4 as a gear member which rotates within a predetermined range by actuation of the motor 3, the moving member 5 having a cylindrical rod portion 52 and arranged to be able to move backward and forward in an axial direction with rotation of the sector gear 4, the housing member 2 housing the motor 3, the sector gear 4 and the moving member 5, a coil spring 6 as an elastic member for applying a force to the moving member 5 in a predetermined direction, and a seal member 7 arranged between the case member 21/the cover member 22 (described later) of the housing member 2 and the moving member 5. The rod portion 52 is an example of "the locking member" of the invention. The "locking member" only needs to be a member capable of moving backward and forward to lock the fuel lid 91, and thus does not necessarily need to have a cylindrical shape as does the rod portion 52.

Configuration of the Sector Gear

The sector gear 4 integrally has a fan-shaped portion 41 formed in an arc shape, a rotating shaft portion 42 rotatably coupled to a pin 20 of a case main portion 210 of the case member 21, and an engaging portion 43 extending from the rotating shaft portion 42 toward the side opposite to the fan-shaped portion 41 and engaged with the moving member 5. A gear portion 41a meshing with the worm 30 is formed on the outer periphery of the fan-shaped portion 41.

Configuration of the Moving Member

The moving member 5 is a member formed in a shaft shape as a whole, and integrally has a lock-engaged portion 51 having an engagement recess 510 to be engaged with the engaging portion 43 of the sector gear 4, and the cylindrical rod portion 52 which further extends in an extending direction of the lock-engaged portion 51 from an axial end face 51c of the lock-engaged portion 51 on the opposite side to the coil spring 6.

A protruding portion 511 is provided on the lock-engaged portion 51 so as to protrude from an axial end face 51b located on the opposite side to the axial end face 51c. The protruding portion 511 is coupled to an end 6a of the coil spring 6.

An outer peripheral surface 52b of the rod portion 52 is a smooth surface without pits and bumps throughout the axial and circumferential directions. In addition, an inclined surface 52a inclined with respect to the axial direction is provided at a tip of the rod portion 52. The inclined surface 52a is formed as a sliding surface which slides on an end face 911b of the locking plate 911 during the closing operation of the fuel lid 91 (see FIG. 2). This reduces shock on the locking plate 911 of the fuel lid 91 and on the moving member 5 during the closing operation of the fuel lid 91.

Configuration of the Coil Spring

The coil spring 6 is arranged in a compressed state, with the end 6a thereof coupled to the protruding portion 511 of the lock-engaged portion 51 of the moving member 5 and another end 6b coupled to a projecting portion 214 formed on a slidably-housing portion 210c of the case member 21 (described later). Thus, the moving member 5 constantly receives a force from the coil spring 6 in the axial direction, from the retracted position toward the protruded position.

Configuration of the Housing Member

As shown in FIG. 4, the housing member 2 has the case member 21 having a motor housing portion 210a for housing the motor 3, the cover member 22 covering an opening (openings 210d and 211d, described later) of the case member 21, and a cylindrical member 23 fixed onto first and second rod supporting portions 211 and 221 of the case member 21 and the cover member 22 in a state that the cover member 22 is attached to the case member 21. A combination of the case member 21 and the cover member 22 is an example of "the case main body" of the invention, and the cylindrical member 23 is an example of "the cylindrical cap" of the invention.

Configuration of the Case Member

The case member 21 has the case main portion 210 and the first rod supporting portion 211. The case main portion 210 has the motor housing portion 210a described previously, a gear housing portion 210b for housing the sector gear 4, and the slidably-housing portion 210c slidably housing the lock-engaged portion 51 of the moving member 5. The first rod supporting portion 211 has a semi-cylindrical shape and is formed to protrude from the case main portion 210 in the axial direction of the moving member 5.

The case member 21 also has first to sixth projections 21a to 21f which are respectively engaged with first to sixth locking claws 22a to 22f provided on the cover member 22. This configuration allows the case member 21 and the cover member 22 to be fastened to each other. The gear housing portion 210b and the slidably-housing portion 210c of the case member 21 are divided by a partition wall 24.

Configuration of the Cover Member

The cover member 22 has a cover main portion 220 and the second rod supporting portion 221. The cover main portion 220 covers the opening 210d of the motor housing portion 210a/the gear housing portion 210b/the slidably-housing portion 210c of the case member 21. The second rod supporting portion 221 has a semi-cylindrical shape, is formed to protrude from the cover main portion 220 in the axial direction of the moving member 5 and covers the opening 211d of the first rod supporting portion 211. In the state that the cover member 22 is attached to the case member 21, the first rod supporting portion 211 and the second rod supporting portion 221 are combined and form a cylindrical shape. This cylinder-shaped section (hereinafter, referred to as "cylinder portion 800") is formed as a rod housing portion which axially movably houses the rod portion 52 of the moving member 5. The cylindrical member 23 is fitted around the cylinder portion 800.

Configuration of the First and Second Rod Supporting Portions

The first rod supporting portion 211 has first and second locking claws 211b and 211c which are formed on the outer periphery and are respectively engaged with first and second locking holes 231a and 231b formed on a first cylindrical portion 231 of the cylindrical member 23 (described later). The first and second locking holes 231a and 231b are provided at positions 180 degrees apart in a circumferential direction of the first cylindrical portion 231.

The first rod supporting portion 211 also has a first rib portion 211f which has a semi-cylindrical shape and protrudes along the axial direction of the first rod supporting portion 211 from an end face 211e facing the cylindrical member 23. The first rib portion 211f is provided on the radially inner side of the end face 211e. In addition, the first rib portion 211f is provided along a circumferential direction of the first rod supporting portion 211 and has a C-shape when viewed from the cylindrical member 23 side in the axial direction.

The second rod supporting portion 221 has first and second locking claws 221b and 221c which are formed on the outer periphery and are respectively engaged with the first and second locking holes 231a and 231b formed on the first cylindrical portion 231 of the cylindrical member 23. The first locking claw 211b of the first rod supporting portion 211 and the first locking claw 221b of the second rod supporting portion 221 form one locking claw, and the second locking claw 211c of the first rod supporting portion 211 and the second locking claw 221c of the second rod supporting portion 221 form one locking claw.

The second rod supporting portion 221 also has a second rib portion 221f which has a semi-cylindrical shape and protrudes along the axial direction of the second rod supporting portion 221 from an end face 221e facing the cylindrical member 23. The second rib portion 221f is provided on the radially inner side of the end face 221e. In addition, the second rib portion 221f is provided along a circumferential direction of the second rod supporting portion 221 and has a C-shape when viewed from the cylindrical member 23 side in the axial direction.

In the state that the cover member 22 is attached to the case member 21, the first rib portion 211f of the first rod supporting portion 211 and the second rib portion 221f of the second rod supporting portion 221 are combined and form a ring-shaped circumferential wall 81. The circumferential wall 81 is sandwiched between an inner peripheral surface 71a of a main body 71 of the seal member 7 (described later) and the outer peripheral surface 52b of the rod portion 52.

Configuration of the Cylindrical Member

As shown in FIGS. 5A and 5B, the cylindrical member 23 integrally has the first cylindrical portion 231 arranged on the case member 21/the cover member 22 side, a second cylindrical portion 232 arranged on the opposite side to the first cylindrical portion 231 in the axial direction, and a third cylindrical portion 233 provided between the first and second cylindrical portions 231 and 232. The seal member 7 is sandwiched between the cylindrical member 23 and the cylinder portion 800.

The first cylindrical portion 231 has a housing space 231c for housing the cylinder portion 800 formed by combining the first and second rod supporting portions 211 and 221 and opens on the case member 21/the cover member 22 side. The first and second locking holes 231a and 231b of the first cylindrical portion 231 are respectively engaged with the first locking claws 211b, 221b and the second locking claws 211c, 221c of the case member 21 and the cover member 22. This configuration prevents the cylindrical member 23 from coming off from the cylinder portion 800 of the case member 21 and the cover member 22.

An insertion hole 230 for inserting the rod portion 52 is formed on the second cylindrical portion 232. The insertion hole 230 of the second cylindrical portion 232 and the housing space 231c of the first cylindrical portion 231 are connected in the axial direction. An inner surface 230a of the insertion hole 230 of the second cylindrical portion 232 is opposed to the outer peripheral surface 52b of the rod portion 52 with a slight gap therebetween. The seal member 7 seals this gap. The inner diameter of the second cylindrical portion 232 is smaller than the inner diameter of the first cylindrical portion 231.

The third cylindrical portion 233 is formed to protrude radially outward from an outer peripheral surface 232b of the second cylindrical portion 232. The third cylindrical portion 233 also has first and second claws 233b and 233c which are formed to extend from an axial end face 233a on the second cylindrical portion 232 side. The vehicle lid lock device 100 is fixed to a vehicle body by engaging the first and second claws 233b and 233c with the ring-shaped vehicle body attachment member 90.

Figure 6:
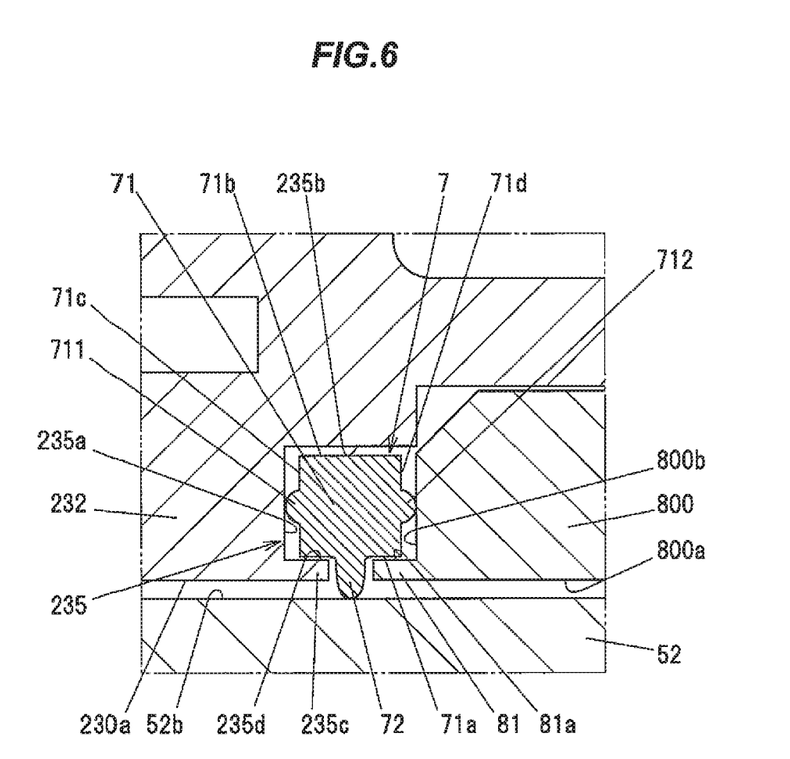
FIG. 6 is an enlarged view of FIG. 5B showing the essential portion of the vehicle lid lock device.

As shown in FIGS. 5B and 6, a housing portion 235 for housing the seal member 7 is provided between the second cylindrical portion 232 of the cylindrical member 23 and the cylinder portion 800. The housing portion 235 is formed between a level difference portion 232c (described later) of the second cylindrical portion 232 and the cylinder portion 800 of the case member 21 and the cover member 22.

The level difference portion 232c of the second cylindrical portion 232 is provided at an axially rear end (an end closer to the cylinder portion 800 of the case member 21 and the cover member 22) of the second cylindrical portion 232 of the cylindrical member 23 and has a ring shape with a larger diameter than the insertion hole 230.

The level difference portion 232c has a first wall surface 235a facing an axial end face 800b (an end face formed by combining the end face 211e of the first rod supporting portion 211 with the end face 221e of the second rod supporting portion 221) of the cylinder portion 800, and a second wall surface 235b facing an outer peripheral surface 71b of the main body 71 of the seal member 7.

The housing portion 235 is a space surrounded by the first and second wall surfaces 235a and 235b of the level difference portion 232c and the end face 800b of the cylinder portion 800.

A protruding portion 235c protruding from the first wall surface 235a of the level difference portion 232c is provided to form the housing portion 235. The protruding portion 235c is located at a radially inner end of the first wall surface 235a. The protruding portion 235c is provided at a position sandwiched between the inner peripheral surface 71a of the main body 71 of the seal member 7 and the outer peripheral surface 52b of the rod portion 52.

Configuration of the Seal Member

The seal member 7 is an elastic body formed in an annular shape and has the main body 71 housed in the housing portion 235 and a lip portion 72 protruding radially inward from the inner peripheral surface 71a of the main body 71. The inner peripheral surface 71a of the main body 71 has an inner diameter larger than the outer diameter of the rod portion 52.

A first projection 711 tightly in contact with the first wall surface 235a is provided on a first end face 71c at which the main body 71 of the seal member 7 faces the first wall surface 235a. A second projection 712 tightly in contact with the end face 800b of the cylinder portion 800 is provided on a second end face 71d at which the main body 71 of the seal member 7 faces the end face 800b. The seal member 7 is housed in the housing portion 235 in a state that the first and second projections 711 and 712 are elastically compressed.

A gap is provided between the outer peripheral surface 71b of the main body 71 of the seal member 7 and the second wall surface 235b of the level difference portion 232c of the second cylindrical portion 232 of the cylindrical member 23 which faces the outer peripheral surface 71b. Thus, contact in the axial direction between an outer peripheral portion of the main body 71 of the seal member 7 and the cylindrical member 23 is avoided when the cylindrical member 23 is inserted onto the rod portion 52 during assembly of the vehicle lid lock device 100, and it is thereby possible to smoothly slide the cylindrical member 23 on the cylinder portion 800. The second wall surface 235b is an example of "the inner surface of the housing portion" of the invention.

The lip portion 72 protrudes from the axial center portion of the inner peripheral surface 71a of the main body 71. A top of the lip portion 72 is in contact with the outer peripheral surface 52b of the rod portion 52. The lip portion 72 is formed to have an inner diameter slightly smaller than the outer diameter of the rod portion 52. Thus, in the state that the seal member 7 is attached, the lip portion 72 is elastically compressed radially outward and the first protrusion 711 is tightly in contact with the first wall surface 235a. Thus, a gap between the second cylindrical portion 232 of the cylindrical member 23 and the rod portion 52 of the moving member 5 is sealed, thereby preventing ingress of water through the insertion hole 230 of the second cylindrical portion 232 of the cylindrical member 23. In addition, the top of the lip portion 72 slides on the outer peripheral surface 52b of the rod portion 52 along with backward and forward movement of the moving member 5.

The radial position of the seal member 7 is determined by the circumferential wall 81 of the cylinder portion 800 and the protruding portion 235c of the level difference portion 232c of the second cylindrical portion 232. In more detail, an outer peripheral surface 81a of the circumferential wall 81 facing the inner peripheral surface 71a of the main body 71 of the seal member 7 and an outer peripheral surface 235d of the protruding portion 235c facing the inner peripheral surface 71a of the main body 71 of the seal member 7 come into contact with a portion of the inner peripheral surface 71a of the main body 71, and the seal member 7 is thereby radially positioned.

A combination of the circumferential wall 81 and the protruding portion 235c is an example of "the positioning portion" of the invention. However, the positioning portion is not limited thereto and may be, e.g., only the circumferential wall 81.

Operation of the Vehicle Lid Lock Device

During the unlocking operation of the vehicle lid lock device 100 configured as described above, the sector gear 4 rotates in a clockwise direction of FIG. 3 by actuation of the motor 3 in the state that the fuel lid 91 is closed, and the moving member 5 moves from the protruded position Y toward the retracted position X against a force applied by the coil spring 6 (see FIG. 2). Thus, the tip of the rod portion 52 of the moving member 5 is withdrawn from the recessed portion 911a of the locking plate 911 of the fuel lid 91, and the locked state is thereby released.

On the other hand, during the locking operation of the vehicle lid lock device 100, the end face 911b of the locking plate 911 of the fuel lid 91 comes into contact with the inclined surface 52a of the rod portion 52 of the moving member 5 by closing movement of the fuel lid 91, and the moving member 5 is thereby pushed from the protruded position into the retracted position. Then, the moving member 5, once moved to the retracted position, moves to the protruded position again due to a force applied by the coil spring 6, and the tip of the rod portion 52 is engaged with the recessed portion 911a of the locking plate 911 of the fuel lid 91. The fuel lid 91 is thereby locked.

Assembly Procedure for the Vehicle Lid Lock Device

When assembling the vehicle lid lock device 100, the motor 3, the sector gear 4 and the moving member 5 with the coil spring 6 attached are respectively housed in the motor housing portion 210a, the gear housing portion 210b and the slidably-housing portion 210c of the case member 21 from the openings 210d/211d side. At this time, the moving member 5 is moved in a direction along the rotating axis of the sector gear 4, and the rod portion 52 of the moving member 5 is housed in the slidably-housing portion 210c from the opening 211d side of the first rod supporting portion 211.

Next, the cover member 22 is attached to the case member 21 so as to cover the openings 210d and 211d. At this time, the second rod supporting portion 221 of the cover member 22 is moved toward the first rod supporting portion 211 in the direction along the rotating axis of the sector gear 4, and the second rod supporting portion 221 is attached to the first rod supporting portion 211 so as to cover the opening 211d of the first rod supporting portion 211. The cylinder portion 800 is thereby formed.

Then, the case member 21 and the cover member 22 are fastened to each other by engaging the first to sixth locking claws 22a to 22f of the cover member 22 with the first to sixth protruding portions 21a to 21f of the case member 21. After that, the seal member 7 is inserted around the rod portion 52 of the moving member 5. At this time, the seal member 7 is attached such that the inner peripheral surface 71a of the main body 71 is in contact with the outer peripheral surface 81a of the circumferential wall 81 and the outer peripheral surface 235d of the protruding portion 235c. The seal member 7 is thereby radially positioned.

After that, the rod portion 52 is inserted into the insertion hole 230 of the cylindrical member 23 which is then slid in the axial direction. Then, the cylindrical member 23 is further slid on the cylinder portion 800 until the first and second projections 711 and 712 of the main body 71 of the seal member 7 are compressed, and the cylindrical member 23 is fitted and fixed to the cylinder portion 800. Assembly of the vehicle lid lock device 100 is thereby completed.

Functions and Effects of the Embodiment

The following functions and effects are obtained by the present embodiment.

(1) Since the seal member 7 has the annular main body 71 housed in the housing portion 235 and the lip portion 72 protruding radially inward from the main body 71 and being in slide contact with the outer peripheral surface 52b of the rod portion 52, deformation of the seal member 7 is prevented. In detail, when the inner diameter of the seal member is smaller than the outer diameter of the rod portion 52 as is in, e.g., the vehicle lid lock device disclosed in JP 2016/188542, the seal member is inserted around the rod portion while elastically expanding the diameter of the seal member at the time of attaching the seal member to the rod portion, and this may cause twist and deformation of the seal member. However, in the vehicle lid lock device of the present embodiment, it is not necessary to expand the diameter of the seal member 7 at the time of inserting the seal member 7 around the rod portion 52. Therefore, deformation of the seal member 7 when inserted around the rod portion 52 is prevented. In other words, a decrease in waterproof properties due to deformation of the seal member 7 can be prevented.

(2) In the vehicle lid lock device 100, the housing portion 235 for housing the seal member 7 is provided on the radially outer side relative to the outer peripheral surface 52b of the rod portion 52. In more detail, a space sandwiched by the first and second wall surfaces 235a and 235b of the cylindrical member 23, the end face 800b of the cylinder portion 800 and the outer peripheral surface 52b of the rod portion 52 is formed as the housing portion 235 for housing the seal member 7. Since this eliminates the necessity of forming a groove for arranging the seal member on the rod portion side which is provided in, e.g., the vehicle lid lock device disclosed in JP 2016/188542, the rod portion 52 can have the entirely smooth outer peripheral surface. Thus, it is possible to improve strength of the moving member 5.

(3) Since a gap is provided between the outer peripheral surface 71b of the main body 71 of the seal member 7 and the second wall surface 235b of the level difference portion 232c of the second cylindrical portion 232 facing the outer peripheral surface 71b of the main body 71, deformation of the main body 71 of the seal member 7 at the time of attaching the cylindrical member 23 to the cylinder portion 800 of the case member 21 and the cover member 22 is prevented during the assembly of the vehicle lid lock device 100.

Furthermore, the seal member 7 is held by the circumferential wall 81 and the protruding portion 235c. Therefore, when, e.g., the moving member 5 moves backward and forward during when the vehicle lid lock device 100 is operated, tilting and misalignment of the seal member 7 due to sliding movement of the tip of the lip portion 72 of the seal member 7 on the outer peripheral surface 52b of the rod portion 52 do not occur. This prevents a decrease in waterproof properties due to misalignment of the seal member 7.

Although the invention has been described based on the embodiment, the invention according to claims is not to be limited to the embodiment described above.

Further, please note that all combinations of the features described in the embodiment are not necessary to solve the problem of the invention. In addition, the invention can be appropriately modified and implemented without departing from the gist thereof.

Figure 7:
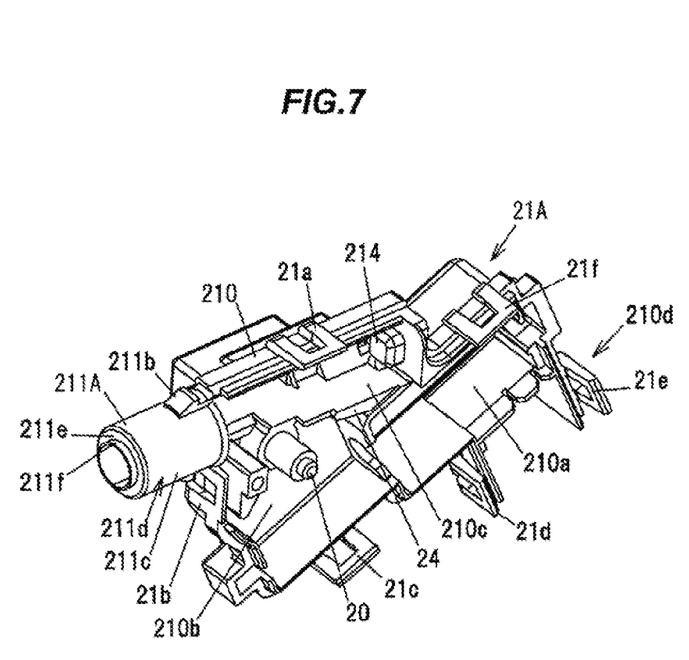
FIG. 7 is a perspective view showing an example configuration of the case member in a modification.

For example, although the cylinder portion 800 formed by combining the first rod supporting portion 211 with the second rod supporting portion 221 is formed as a rod housing portion for housing a rod in the embodiment, it is not limited thereto. As a modification, a case member 21A having a cylindrical rod housing portion 211A for axially movably housing the rod portion 52 as shown in FIG. 7 may be provided.

REFERENCE SIGNS LIST

2 HOUSING MEMBER
3 MOTOR
4 SECTOR GEAR
5 MOVING MEMBER
6 COIL SPRING
7 SEAL MEMBER
9 VEHICLE BODY
21 CASE MEMBER
22 COVER MEMBER
23 CYLINDRICAL MEMBER
30 WORM
52 ROD PORTION
52b OUTER PERIPHERAL SURFACE
71 MAIN BODY
71a INNER PERIPHERAL SURFACE
71b OUTER PERIPHERAL SURFACE
72 LIP PORTION
81 CIRCUMFERENTIAL WALL
81a OUTER PERIPHERAL SURFACE
91 FUEL LID
100 VEHICLE LID LOCK DEVICE
210 CASE MAIN PORTION
211f FIRST RIB PORTION
220 COVER MAIN PORTION
221e END FACE
221f SECOND RIB PORTION
230 INSERTION HOLE
230a INNER SURFACE
231 FIRST CYLINDRICAL PORTION
232 SECOND CYLINDRICAL PORTION
233 THIRD CYLINDRICAL PORTION
235 HOUSING PORTION
235a FIRST WALL SURFACE
235b SECOND WALL SURFACE
235c PROTRUDING PORTION
235d OUTER PERIPHERAL SURFACE
511 PROTRUDING PORTION

The invention claimed is:
1. A vehicle lid lock device, comprising:
a locking member for locking a lid provided on a vehicle;
a housing member in which an insertion hole is formed into which the locking member is inserted and which houses the locking member enabled to move backward and forward; and
an annular seal member that is housed in a housing portion of the housing member and that seals a gap between an inner surface of the insertion hole of the housing member and an outer surface of the locking member, wherein the seal member comprises a seal main body comprising an inner peripheral surface with an inner diameter larger than an outer diameter of the locking member, and a lip portion that protrudes radially inward from the inner peripheral surface of the seal main body and that is in slide contact with the outer surface of the locking member, wherein the housing member comprises a case main body comprising a cylinder portion supporting the locking member and a cylindrical cap, wherein the seal member is sandwiched between the cylinder portion of the case main body and the cylindrical cap in an axial direction, wherein each of the cylinder portion and the cylindrical cap is provided with a positioning portion that intervenes between the seal main body and the locking member and that defines a radial position of the seal member by restricting movement of the seal main body toward the locking member side, and wherein the lip portion protrudes between the positioning portion of the cylinder portion and the positioning portion of the cylindrical cap toward the locking member side.

2. The vehicle lid lock device according to claim 1, wherein a gap is formed between an outer peripheral surface of the main body of the seal member and an inner surface of the housing portion that faces the outer peripheral surface of the main body.

* * * * *